**

US011310784B2

(12) United States Patent
Parkvall et al.

(10) Patent No.: US 11,310,784 B2
(45) Date of Patent: Apr. 19, 2022

(54) CONFIGURATION-DEPENDENT DCI TIMING

(71) Applicant: Telefonaktiebolaget LM Ericsson (publ), Stockholm (SE)

(72) Inventors: Stefan Parkvall, Bromma (SE); Robert Baldemair, Solna (SE); Erik Dahlman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/496,262

(22) PCT Filed: Mar. 28, 2018

(86) PCT No.: PCT/SE2018/050330
§ 371 (c)(1),
(2) Date: Sep. 20, 2019

(87) PCT Pub. No.: WO2018/186787
PCT Pub. Date: Oct. 11, 2018

(65) Prior Publication Data
US 2020/0029313 A1 Jan. 23, 2020

Related U.S. Application Data

(60) Provisional application No. 62/480,840, filed on Apr. 3, 2017.

(51) Int. Cl.
*H04W 72/04* (2009.01)
*H04B 7/26* (2006.01)
(Continued)

(52) U.S. Cl.
CPC ........ *H04W 72/042* (2013.01); *H04B 7/2656* (2013.01); *H04L 5/0048* (2013.01);
(Continued)

(58) Field of Classification Search
CPC ........... H04W 72/042; H04W 72/1294; H04W 72/14; H04W 72/1289; H04W 72/0446;
(Continued)

(56) References Cited

U.S. PATENT DOCUMENTS

2014/0086112 A1* 3/2014 Stern-Berkowitz ........................
H04L 1/1822
370/280
2015/0304096 A1 10/2015 Sahlin et al.
(Continued)

OTHER PUBLICATIONS

Unknown, Author, "3rd Generation Partnership Project; Technical Specification Group Radio Access Network; Study on New Radio (NR) Access Technology; Physical Layer Aspects (Release 14)", 3GPP TR 38.802 V1.2.0, Feb. 2017, pp. 1-83.
(Continued)

*Primary Examiner* — Hardikkumar D Patel
(74) *Attorney, Agent, or Firm* — Murphy, Bilak & Homiller, PLLC

(57) ABSTRACT

The disclosure relates to a method of operating a wireless device. The method comprises receiving (10), from a network node, control information indicating a timing of a scheduled transmission or reception. The method further comprises determining (20) at least one slot or symbol for the scheduled transmission or reception based on the control information indicating the timing, wherein the determining is dependent on whether the wireless device is configured with a semi-static time division duplex, TDD, uplink-downlink allocation or not. The method also comprises performing (30) the scheduled transmission or reception in the determined at least one slot or symbol.

5 Claims, 5 Drawing Sheets

(51) Int. Cl.
  *H04L 5/00* (2006.01)
  *H04L 5/14* (2006.01)
  *H04W 72/12* (2009.01)
  *H04W 72/14* (2009.01)

(52) U.S. Cl.
  CPC ........... *H04L 5/14* (2013.01); *H04W 72/1294* (2013.01); *H04W 72/14* (2013.01)

(58) Field of Classification Search
  CPC ....... H04W 4/06; H04W 8/005; H04W 12/02; H04W 12/0431; H04W 16/32; H04W 24/02; H04W 24/10; H04W 28/0231; H04W 36/0066; H04W 36/0069; H04W 36/22; H04W 48/08; H04W 48/10; H04W 48/16; H04W 48/20; H04W 52/0251; H04W 56/001; H04W 68/02; H04W 72/00; H04W 72/02; H04W 72/0406; H04W 72/0413; H04W 72/046; H04W 72/12; H04W 72/1205; H04W 72/1263; H04W 72/1278; H04W 74/00; H04W 76/11; H04W 76/14; H04W 76/27; H04W 76/28; H04W 84/12; H04W 88/06; H04W 12/50; H04W 84/045; H04W 12/06; H04W 12/04; H04W 88/08; H04B 7/2656; H04B 7/0417; H04B 7/0456; H04L 5/0048; H04L 5/14; H04L 5/1469; H04L 5/0094; H04L 5/0078; H04L 5/0035; H04L 1/1812; H04L 1/1887; H04L 5/0051; H04L 5/0055; H04L 5/0057; H04L 5/0062; H04L 5/0092; H04L 5/0096; H04L 5/22; H04L 9/14; H04L 43/08; H04L 63/0428; H04L 63/30; H04L 65/1006; H04L 65/4076; H04L 65/602; H04L 65/608; H04L 65/80; H04L 67/02; H04L 1/18; H04L 2209/24; H04L 2209/80; H04L 5/0076; H04J 3/00; Y02B 70/30; Y02D 30/70

See application file for complete search history.

(56) References Cited

U.S. PATENT DOCUMENTS

| | | |
|---|---|---|
| 2016/0156454 A1 | 6/2016 | Khoryaev et al. |
| 2016/0323852 A1 | 11/2016 | Golitschek Edler Von Elbwart et al. |
| 2017/0026164 A1 | 1/2017 | Damnjanovic et al. |
| 2017/0222783 A1* | 8/2017 | Liang .................... H04L 5/0057 |

OTHER PUBLICATIONS

Unknown, Author, "Downlink HARQ-ACK feedback timing", 3GPP TSG RAN WG1 Meeting #88bis, R1-1705106, Spokane, USA, Apr. 3-7, 2017, pp. 1-4.

* cited by examiner

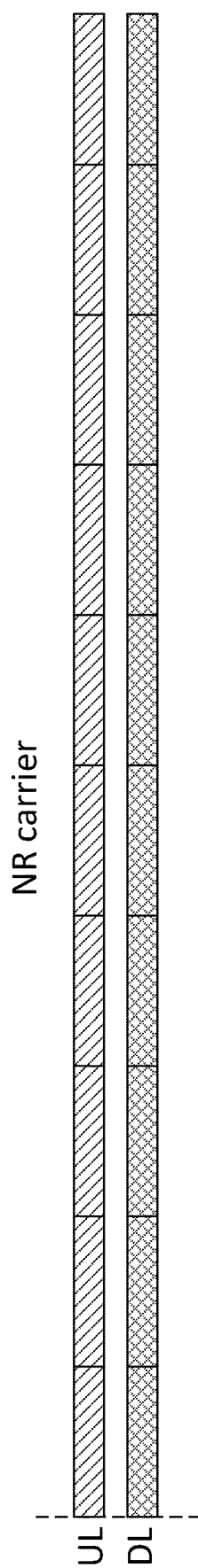
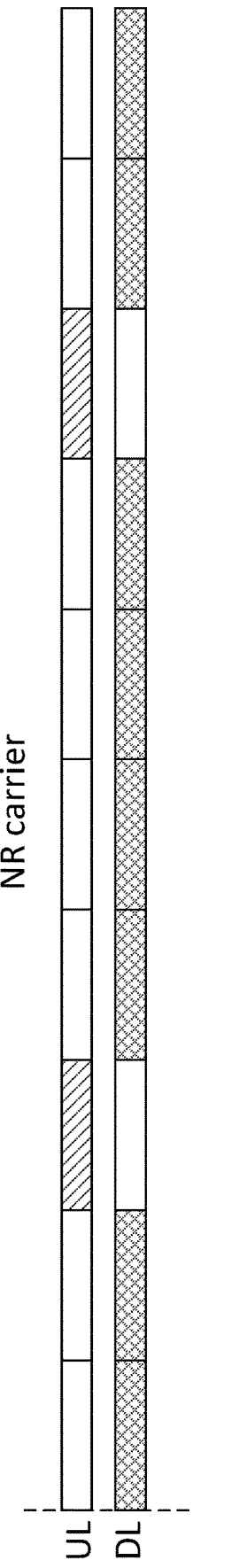
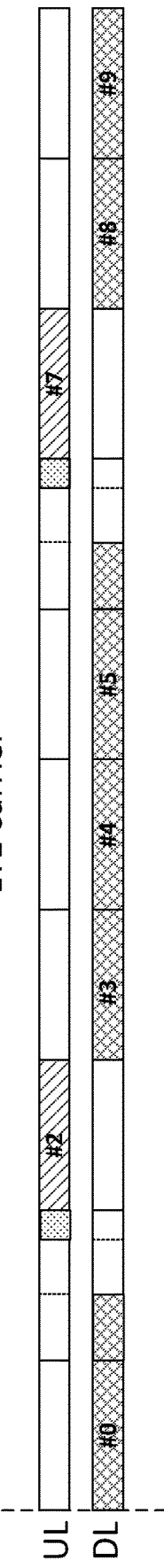
PRIOR ART
Figure 2a
PRIOR ART
Figure 2b

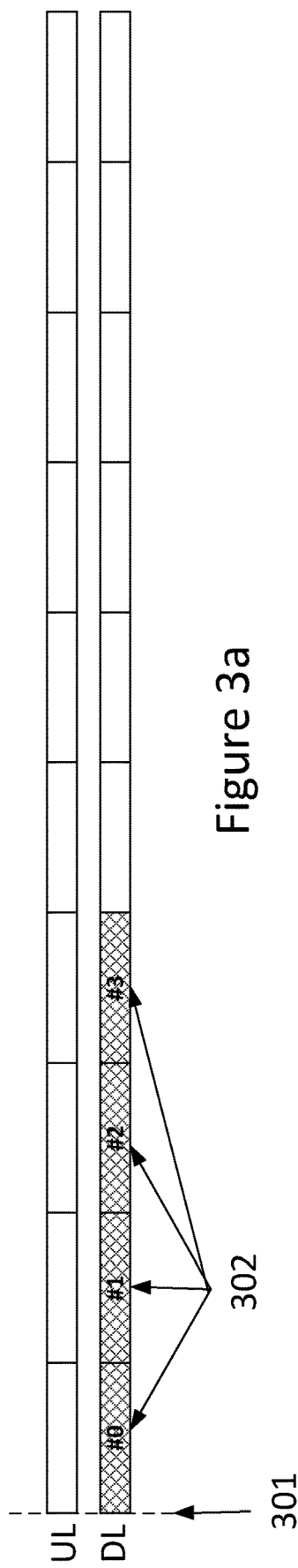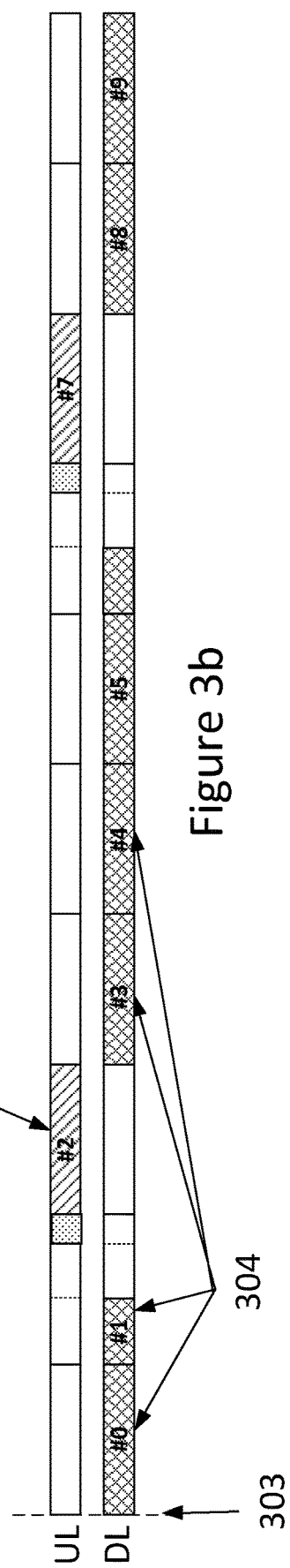

CONFIGURATION-DEPENDENT DCI TIMING

TECHNICAL FIELD

The invention relates to methods for scheduling, as well as to a wireless device, a network node, computer programs, and computer program products.

BACKGROUND

The fifth generation (5G) of mobile telecommunications and wireless technology is not yet fully defined but in an advanced draft stage within $3^{rd}$ Generation Partnership Project (3GPP). It includes work on 5G New Radio (NR) Access Technology. Long term evolution (LTE) terminology is used in this disclosure in a forward looking sense, to include equivalent 5G entities or functionalities although a different term is specified in 5G. A general description of the agreements on the physical layer aspects of 5G NR Access Technology so far is contained in 3GPP Technical Report 38.802 v1.2.0 (2017-02). Final specifications may be published inter alia in the future 3GPP TS 38.2** series.

FIG. 1 schematically illustrates a wireless communication network, where a wireless device, also referred to as a user equipment (UE) UE 1 is wirelessly connectable to a base station BS 2. The BS 2 is connected to a core network (CN) 3. In an NR access network, the BS may be referred to as a gNB, and the corresponding terminology for an LTE access network is an eNB. The BS 2 serves the UE 1 located within the BS's geographical area of service, called a cell.

NR uses scheduled transmission where the scheduler (which may be a part of or a functionality of the gNB), provides information to the UE related to—among other things—when to transmit or receive data. This information from the scheduler is typically provided as part of the Downlink Control Information (DCI). The information sent to the UE relating to when to transmit or receive data as part of the DCI, may indicate the slot number where the transmission or reception will or should occur. As one example, the DCI received in slot n could contain information i used to indicate that transmission of the corresponding uplink data, or reception of the corresponding downlink data, occurs in slot n+i.

NR supports dynamic Time Division Duplex (TDD), which means that it is part of the scheduling decision whether a UE should receive or transmit in a slot. As illustrated in FIG. 2a, NR slots can be freely used for uplink or downlink as part of the scheduling decisions (but not uplink and downlink at the same time). However, for TDD coexistence reasons, NR may need to use the same uplink/downlink allocation as a neighboring LTE carrier is using. FIG. 2b illustrates one example of such a scenario where the upper part of the figure illustrates the NR carrier where a semi-static uplink-downlink allocation is configured for coexistence with the neighboring LTE carrier illustrated in the lower part of the figure. This could in principle be left as a choice for the scheduler, although it has been agreed that the network can use Radio Resource Control (RRC) signaling to inform the UE that the network will follow a semi-static uplink/downlink allocation.

SUMMARY

It is an object to provide a solution making it possible to limit the amount of DCI signaling at scheduling while allowing for both dynamic TDD and semi-static TDD uplink-downlink allocation.

According to a first aspect, a method of operating a wireless device, or a method performed by a wireless device is provided. The method comprises receiving, from a network node, control information indicating a timing of a scheduled transmission or reception and determining at least one slot or symbol for the scheduled transmission or reception based on the control information indicating the timing. The determining is dependent on whether the wireless device is configured with a semi-static time division duplex, TDD, uplink-downlink allocation or not. The method also comprises performing the scheduled transmission or reception in the determined at least one slot or symbol.

According to a second aspect, a method of operating a network node is provided. The method comprises scheduling the wireless device for transmission or reception in at least one set of slots or symbols and determining control information indicating a timing of the scheduled transmission or reception. The determining is dependent on whether the wireless device is configured with a semi-static time division duplex, TDD, uplink-downlink allocation or not. The method also comprises transmitting, to the wireless device, the control information indicating the timing.

According to further aspects, a wireless device, a network node, computer programs, and carriers or computer program products are provided.

One advantage of embodiments is an efficient usage of the limited DCI resources.

Generally, all terms used in the embodiments are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Other objects, advantages and features of embodiments will be explained in the following detailed description when considered in conjunction with the accompanying drawings and embodiments.

BRIEF DESCRIPTION OF THE DRAWINGS

The invention is now described, by way of example, with reference to the accompanying drawings, on which:

FIG. 2a is a schematic illustration of an NR UL/DL carrier showing that NR slots can be freely used for uplink or downlink as part of the scheduling decisions (dynamic TDD);

FIG. 2b is a schematic diagram illustrating that the NR carrier is adapted to a semi-static uplink-downlink allocation for coexistence with the neighboring LTE carrier;

FIG. 3a-b are schematic diagrams illustrating scheduling according to embodiments;

DETAILED DESCRIPTION

Figure 1:
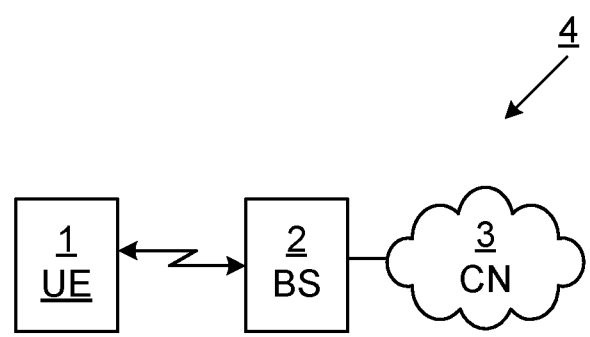
FIG. 1 is a schematic diagram illustrating an environment where embodiments presented herein may be applied.

In the following, different aspects will be described in more detail with references to certain embodiments and to accompanying drawings. For purposes of explanation and not limitation, details are set forth, such as particular scenarios and techniques, in order to provide a thorough understanding of the different embodiments. However, other embodiments that depart from these details may also exist.

Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes.

Some or all of the functions described may be implemented using hardware circuitry, such as analog and/or discrete logic gates interconnected to perform a specialized function, or ASICs. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology may be embodied entirely within any form of computer-readable memory, including non-transitory embodiments such as solid-state memory, magnetic disk, or optical disk containing an appropriate set of computer instructions or computer program code that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and where appropriate state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Herein the terms user equipment (UE), terminal, and wireless device are used interchangeably to denote a device that communicates with a network infrastructure, a wireless communication network, or a radio access network. The term should not be construed as to mean any specific type of device, i.e. it applies to them all, and the embodiments described herein are applicable to all devices that use the concerned solution to solve the problems as described. Wireless devices are referred to as UE in 3GPP terminology, and may comprise, for example, cellular telephones, personal digital assistants, smart phones, laptop computers, handheld computers, machine-type communication/machine-to-machine (MTC/M2M) devices or other devices or terminals with wireless communication capabilities. Wireless devices may refer to terminals that are installed in fixed configurations, such as in certain machine-to-machine applications, as well as to portable devices, or devices installed in motor vehicles.

Similarly, a network node is intended to denote the node in the network infrastructure that communicates with the UE, sometimes also referred to as a base station (BS). Different names may be applicable depending on the radio access technology, such as eNB, and gNB. The functionality of the network node may be distributed in various ways. For example, there could be a radio head terminating parts of the radio protocols and a centralized unit that terminates other parts of the radio protocols. The term network node will refer to all alternative architectures that can implement the concerned invention, and no distinction between such implementations will be made.

Embodiments are described in a non-limiting general context in relation to an example scenario in an NR wireless communication network or system, such as the network illustrated in FIG. 1, in which a gNB sends timing information as part of the DCI to the UE for scheduling. However, embodiments of the invention may also be applied in a Device to Device (D2D) scenario, where it is a wireless device that schedules and thus sends scheduling control information comprising timing information to another wireless device.

An object of embodiments is to make the interpretation by the UE or wireless device of the timing information in the DCI dependent on whether the UE has been configured with a semi-static uplink/downlink allocation or not. If the UE is not configured with a semi-static uplink/downlink allocation, it means that dynamic TDD is used, as illustrated in FIG. 2a. The timing information, which may also be referred to as information indicating a timing of a scheduled transmission or reception, may e.g. be the information or variable i described in the background section.

In the description, hereinafter, the timing information is discussed in relation to data transmission in the downlink (DL), i.e., the timing information provided to the UE in the DCI is used by the UE to determine when the UE is scheduled to receive a downlink transmission. However, the same principle can be applied to other uplink (UL) or DL channels. As one example, timing information provided to the UE in the DCI or some other DL control channel may be used by the UE to determine when the UE is scheduled to transmit UL control signaling or UL data. In some cases, a physical uplink control channel (PUCCH) spans multiple symbols or even slots. Therefore, also timing information received by the UE in the DCI related to the PUCCH can be handled in the same way as timing information related to a data transmission as described herein.

It may be assumed that the DCI received by the UE comprises timing information, such as information indicating in which slot or Orthogonal frequency-division multiplexing (OFDM) symbol a data transmission starts. This could e.g. be the information, parameter or variable i described in the background section. Timing information indicating in which slot or symbol a transmission or reception starts may be denoted t_start. The timing information could also include a length of the transmission, denoted t_length, or information where the transmission ends, t_end, e.g. indicating whether it is a single slot or a multi-slot transmission. The complete set of timing information in the DCI, i.e. one or more of t_start, t_length, t_end, or the variable i described in the background, may be denoted T.

The set of actual slots or symbols (in embodiments comprising single or multiple slots or symbols) used or scheduled for the data transmission is denoted S. How to determine the set S based on the received timing information T depends on whether the UE has been configured with a semi-static TDD uplink/downlink allocation or not.

If the UE is not configured with a semi-static uplink-downlink allocation, and thus is configured with dynamic TDD, the set S of slots or OFDM symbols used for the data transmission is given by a first function $f1$ according to $S=f1(T)$. For example, a typical function when scheduling downlink transmissions could be such that the timing information T refers to the actual slots, i.e. the data transmission starts in the same slot as the DCI was received in, t_start=0, and spans t_length contiguous slots. This embodiment is illustrated in FIG. 3a. The arrow 301 illustrates that the DCI is received in slot #0. The timing information T in DCI indicates that t_start is equal to 0, i.e. that the DL data transmission starts in the slot that the DCI was received in, which is in slot #0. The DCI also indicates that the DL transmission spans four slots, i.e. t_length is equal to four. The set S is thus determined to comprise slots #0 to slot #4 (indicated by reference numeral 302) in this case where the UE is configured to use dynamic TDD and not semi-static uplink-downlink allocation. It should be noted that timing information may very well indicate non-contiguous slots in another embodiment. If t_start≠0 is provided in the DCI, the DL transmission would extend from slot n+t_start to n+t_start+t_length−1 with n being the slot in which the DCI is received.

If the UE is configured with a semi-static uplink-downlink allocation, the set S is given by a second function $f2$ according to $S=f2(T)$. For example, a typical function when scheduling downlink transmissions could be such that the timing information T only refers to semi-statically configured downlink slots, i.e. the data starts in the same slot as the DCI was received in, t_start=0, and spans t_length downlink slots, i.e. slots allocated to be downlink slots in the semi-static uplink-downlink allocation. This embodiment is illustrated in FIG. 3b. The arrow 303 illustrates that the DCI is received in slot #0. The timing information T in DCI indicates that t_start is equal to 0, i.e. that the DL data transmission starts in the slot that the DCI was received in, which is in slot #0. The DCI also indicates that the DL transmission spans four slots, i.e. t_length is equal to four. The set S is thus determined to comprise slots #0, slot #1, slot #3, and slot #4 (indicated by reference numeral 304) in this case where the UE is configured to use semi-static uplink-downlink allocation. If t_start≠0 is provided in the DCI, the DL transmission would extend from downlink slot n+t_start to n+t_start+t_length−1 with n being the downlink slot in which the DCI is received.

The network node or gNB signaling the DCI needs to take the configuration of the TDD uplink-downlink allocation of the UE into account when determining the timing information T in DCI relating to scheduled slots or symbols. In the example embodiment illustrated in FIG. 3b, the gNB could send a Physical Downlink Control Channel (PDCCH) comprising DCI in slot #1 for a scheduled DL slot #3 on a Physical Downlink Shared Channel (PDSCH). If the UE is configured with a semi-static uplink-downlink allocation, the timing information would be determined to indicate one "1" as the slot offset between PDCCH and PDSCH. Although the slot difference is two "2", slot #2, 305, is UL and should therefore not be counted. Without a semi-static uplink-downlink TDD allocation, the gNB would determine the timing information to indicate "2", as all slots are counted. A more general way of describing the functionality of the gNB, is that the gNB may determine a slot offset of K slots for the case when the UE is not configured with a semi-static uplink-downlink TDD allocation. On the other hand, when the UE is configured with a semi-static uplink-downlink TDD allocation, K is reduced by the number of UL slots configured between the PDCCH slot and the PDSCH slot.

The example embodiments described with reference to FIGS. 3a-b are multi-slot examples. However, the determination of the set S dependent on whether the UE is configured with a semi-static uplink-downlink allocation or not is also applicable if the length is only one slot or symbol. In one example of a single slot embodiment applicable for UL, the timing information T received by the UE in DCI indicates n+2, where n is the slot in which the UL grant is received. The UE determines the set S to comprise either the single slot n+2, when the UE is not configured with a semi-static uplink-downlink allocation, or the second-next UL slot otherwise.

The time units used in FIGS. 3a-b and in other example embodiments described herein are slots. However, in other embodiments the timing information may relate to symbol timing.

In embodiments, the gNB or BS may configure the UE with a table which maps control information in the DCI to a certain set S of slots or symbols. The gNB may then e.g. signal an index pointing at an entry in the table that indicates what slot(s) or symbol(s) to use for the scheduled transmission or reception, the index thus corresponding to the timing information T.

Embodiments of Methods Described with Reference to FIG. 4 and FIG. 6

Figure 4:
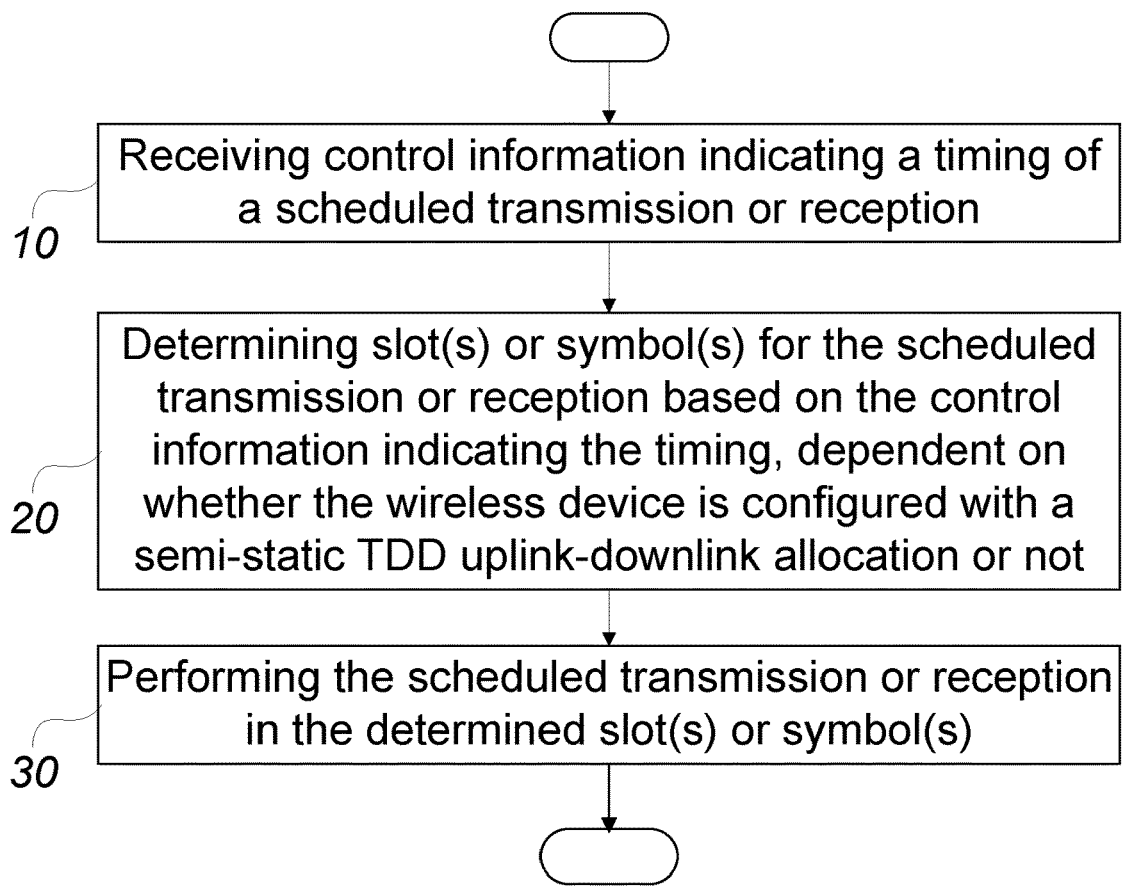
FIG. 4 is a flowchart illustrating the method in a wireless device according to embodiments.

FIG. 4 is a flowchart illustrating one embodiment of a method of operating a wireless device, which may also be understood as a method performed by a wireless device.

The method comprises:
- 10: Receiving, from a network node, control information indicating a timing T of a scheduled transmission or reception. In embodiments, the network node may be a gNB of an NR access network.
- 20: Determining at least one slot or symbol S for the scheduled transmission or reception based on the control information indicating the timing, wherein the determining is dependent on whether the wireless device is configured with a semi-static time division duplex, TDD, uplink-downlink allocation or not.
- 30: Performing the scheduled transmission or reception in the determined at least one slot or symbol.

In embodiments, the received control information may indicate in which slot or symbol the scheduled transmission or reception starts (see t_start described above). The received control information may also indicate a length of the scheduled transmission or reception (see t_length described above). The received control information may also indicate in which slot or symbol the scheduled transmission or reception ends (see t_end described above). The received control information may indicate the timing by reference to a slot or symbol in which the control information is received (see parameter i and n described above).

The determining 20 of at least one slot or symbol may comprise:
- when the wireless device is not configured with a semi-static TDD uplink-downlink allocation, determining a set of slots or symbols according to a first function (see function $f1$ above) of the control information,
- when the wireless device is configured with a semi-static TDD uplink-downlink allocation, determining the set of slots or symbols according to a second function (see function $f2$ above) of the control information different from the first function.

The determining 20 of slots or symbols may comprise:

when the wireless device is not configured with a semi-static TDD uplink-downlink allocation, determining a set of slots or symbols in accordance with the indicated timing. In one embodiment, the slots or symbols may be contiguous as illustrated in FIG. 3a.

when the wireless device is configured with a semi-static TDD uplink-downlink allocation, determining the set of slots or symbols in accordance with the indicated timing while taking the semi-static TDD uplink-downlink allocation into account (see e.g. FIG. 3b).

In one embodiment of the method, the control information indicates a timing of a scheduled transmission, and the determining of the set of slots or symbols in accordance with the indicated timing while taking the semi-static TDD uplink-downlink allocation into account comprises determining the set of slots or symbols depending on certain properties of the semi-static TDD uplink-downlink allocation. The properties may e.g. be what slots or symbols that are allocated to UL in the configuration.

Therefore, in one embodiment the determining of the set of slots or symbols comprises determining the set of slots or symbols only among uplink slots or symbols of the semi-static TDD uplink-downlink allocation. In another embodiment, the control information indicates a timing of a scheduled reception, and determining the set of slots or symbols in accordance with the indicated timing while taking the semi-static TDD uplink-downlink allocation into account comprises determining the set of slots or symbols only among downlink slots or symbols of the semi-static TDD uplink-downlink allocation.

In one embodiment, the determining 20 of the at least one slot or symbol comprises when the wireless device is not configured with a semi-static TDD uplink-downlink allocation:

determining a set of contiguous slots or symbols among slots or symbols of the configured uplink-downlink allocation, wherein the control information indicates a start slot or start symbol and a length of the set.

Also the network should take the configuration of the TDD uplink-downlink allocation of the UE into account when determining the control information indicating the timing of the scheduled slots or symbols, i.e. the determining would be dependent on whether the configuration of the TDD uplink-downlink allocation of the UE is semi-static or dynamic. FIG. 6 is a flowchart illustrating one embodiment of a method of operating a network node to schedule a wireless device for transmission or reception, which may also be understood as a method performed by a network node. The network node may be a gNB of an NR wireless communication network.

The method comprises:

110: Scheduling the wireless device for transmission or reception in at least one slot or symbol.

120: Determining control information indicating a timing of the scheduled transmission or reception, wherein the determining is dependent on whether the wireless device is configured with a semi-static time division duplex, TDD, uplink-downlink allocation or not.

130: Transmitting, to the wireless device, the control information indicating the timing.

In embodiments, the control information may be determined 120 to indicate at least one of the following:

in which slot or symbol the scheduled transmission or reception starts;

a length of the scheduled transmission or reception;

in which slot or symbol the scheduled transmission or reception ends.

In one embodiment, the control information is determined to indicate the timing by reference to a slot or symbol in which the control information is received by the wireless device.

As a consequence, the transmitted control information may indicate: in which slot or symbol the scheduled transmission or reception starts; a length of the scheduled transmission or reception; and/or in which slot or symbol the scheduled transmission or reception ends. Further, the transmitted control information may indicate the timing by reference to a slot or symbol in which the control information is transmitted.

The determining 120 may comprise, when the wireless device is configured with a semi-static TDD uplink-downlink allocation:

determining the control information taking the semi-static TDD uplink-downlink allocation into account, such that the control information indicates a timing that corresponds to the scheduled set of slots or symbols.

In embodiments, the determining 120 of the control information indicating the timing comprises:

when the wireless device is not configured with a semi-static TDD uplink-downlink allocation, determining the control information such that the scheduled at least one slot or symbol can be determined by the wireless device according to a first function of the control information, and when the wireless device is configured with a semi-static TDD uplink-downlink allocation, determining the control information such that the scheduled at least one slot or symbol can be determined by the wireless device according to a second function of the control information different from the first function.

In embodiments, the wireless device may be configured with a semi-static TDD uplink-downlink allocation and may be scheduled 110 for transmission. The control information may then be determined 120 such that the wireless device determines the scheduled at least one slot or symbol only among uplink slots or symbols of the semi-static TDD uplink-downlink allocation based on the control information.

In embodiments, the wireless device may be configured with a semi-static TDD uplink-downlink allocation and may be scheduled 110 for reception. The control information may then be determined 120 such that the wireless device determines the scheduled at least one slot or symbol only among downlink slots or symbols of the semi-static TDD uplink-downlink allocation based on the control information.

Embodiments of Apparatus Described with Reference to FIG. 5 and FIG. 7

Figure 5:
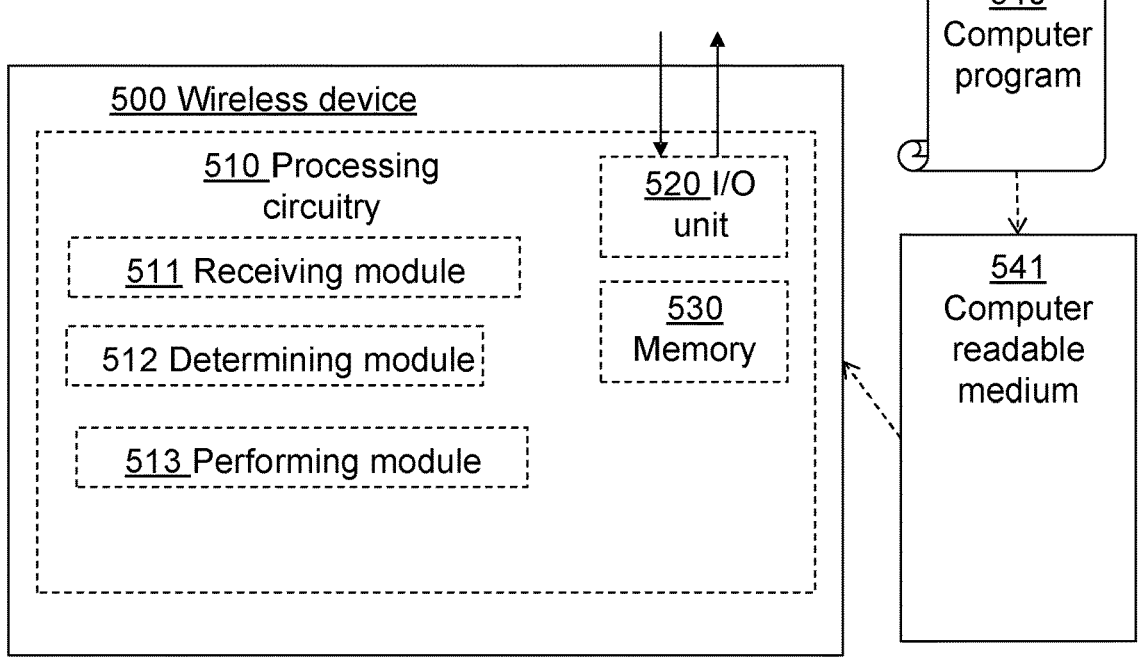
FIG. 5 is a block diagram schematically illustrating a wireless device according to embodiments.

An embodiment of the wireless device 500 is schematically illustrated in the block diagram in FIG. 5. The wireless device 500 is configured to:

receive, from a network node, control information indicating a timing of a scheduled transmission or reception, determine at least one slot or symbol for the scheduled transmission or reception based on the control information indicating the timing, wherein the determining is dependent on whether the wireless device is configured with a semi-static time division duplex, TDD, uplink-downlink allocation or not, perform the scheduled transmission or reception in the determined at least one slot or symbol.

The wireless device may be configured to perform any of the methods previously described e.g. the ones described with reference to FIG. 4.

The wireless device may be configured to receive control information indicating in which slot or symbol the scheduled transmission or reception starts, configured to receive control information indicating a length of the scheduled transmission or reception, configured to receive control information indicating in which slot or symbol the scheduled transmission or reception ends, and/or configured to receive control information indicating the timing by reference to a slot or symbol in which the control information is received.

In embodiments, the wireless device may be configured to determine the at least one slot or symbol by:
  determining a set of slots or symbols according to a first function of the control information, when the wireless device is not configured with a semi-static TDD uplink-downlink allocation,
  determining the set of slots or symbols according to a second function of the control information different from the first function, when the wireless device is configured with a semi-static TDD uplink-downlink allocation.

In embodiments, the wireless device may be configured to determine the at least one slot or symbol by:
  determining a set of slots or symbols in accordance with the indicated timing while taking the semi-static TDD uplink-downlink allocation into account, when the wireless device is configured with a semi-static TDD uplink-downlink allocation.

In embodiments, when the control information indicates a timing of a scheduled transmission, the wireless device may be configured to determine the set of slots or symbols in accordance with the indicated timing while taking the semi-static TDD uplink-downlink allocation into account comprises determining the set of slots or symbols only among uplink slots or symbols of the semi-static TDD uplink-downlink allocation.

In embodiments, when the control information indicates a timing of a scheduled reception, the wireless device may be configured to determine the set of slots or symbols in accordance with the indicated timing while taking the semi-static TDD uplink-downlink allocation into account comprises determining the set of slots or symbols only among downlink slots or symbols of the semi-static TDD uplink-downlink allocation.

In further embodiments, when the wireless device is not configured with a semi-static TDD uplink-downlink allocation, the wireless device may be configured to determine the at least one slot or symbol by determining a set of contiguous slots or symbols among slots or symbols of the configured uplink-downlink allocation, wherein the control information indicates a start slot or start symbol and a length of the set.

As illustrated in FIG. 5, the wireless device 500 may comprise at least one processing circuitry 510 and optionally also a memory 530. In embodiments, the memory 530 may be placed in some other node or unit or at least separately from the wireless device 500. The wireless device 500 may also comprise one or more input/output (I/O) units 520 configured to communicate with a network node such as an gNodeB. The input/output (I/O) unit 520 may in embodiments comprise a transceiver connected to one or more antennas over antenna ports for wireless communication with network nodes in the network. The memory 530 may contain instructions executable by said at least one processing circuitry 510, whereby the wireless device 500 may be configured to perform any of the methods previously described herein, e.g. the ones described with reference to FIG. 4.

In another embodiment also illustrated in FIG. 5, the wireless device 500 may comprise a receiving module 511, a determining module 512, and a performing module 513, adapted to respectively perform the method steps of FIG. 4.

The wireless device 500 may contain further modules adapted to perform any of the methods previously described herein. The modules described above are functional units which may be implemented in hardware, software, firmware or any combination thereof. In one embodiment, the modules are implemented as a computer program running on the at least one processing circuitry 510.

In still another alternative way to describe the embodiment in FIG. 5, the wireless device 500 may comprise a Central Processing Unit (CPU) which may be a single unit or a plurality of units. Furthermore, the wireless device 500 may comprise at least one computer program product (CPP) with a computer readable medium 541, e.g. in the form of a non-volatile memory, e.g. an EEPROM (Electrically Erasable Programmable Read-Only Memory), a flash memory or a disk drive. The CPP may comprise a computer program 540 stored on the computer readable medium 541, which comprises code means which when run on the CPU of the wireless device 500 causes the wireless device 500 to perform the methods described earlier in conjunction with FIG. 4. In other words, when said code means are run on the CPU, they correspond to the at least one processing circuitry 510 of the wireless device 500 in FIG. 5.

Figure 7:
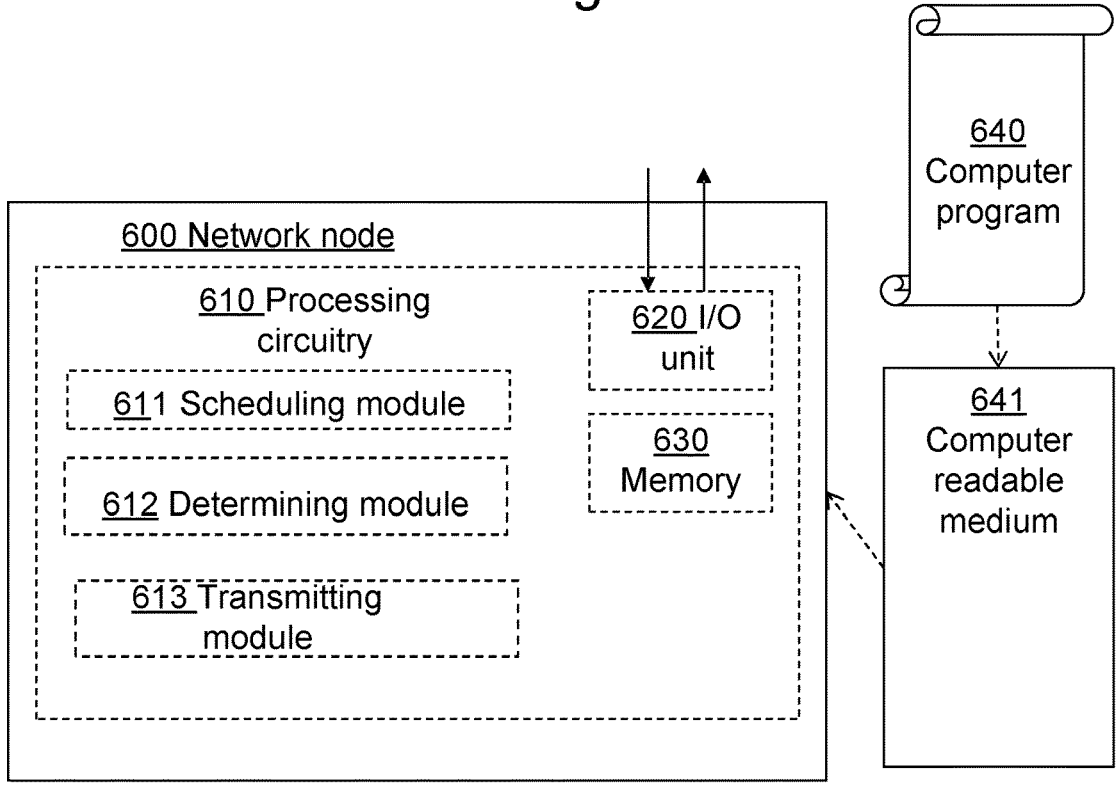
FIG. 7 is a block diagram schematically illustrating a network node according to embodiments.

An embodiment of the network node 600 is schematically illustrated in the block diagram in FIG. 7. The network node 600 is configured to:
  schedule the wireless device for transmission or reception in a set of slots or symbols,
  determine control information indicating a timing of the scheduled transmission or reception, wherein the determining is dependent on whether the wireless device is configured with a semi-static time division duplex, TDD, uplink-downlink allocation or not,
  transmit, to the wireless device, the control information indicating the timing.

The network node 600 may be configured to perform any of the methods previously described e.g. the ones described with reference to FIG. 6.

The network node may be configured to determine the control information to indicate: in which slot or symbol the scheduled transmission or reception starts, a length of the scheduled transmission or reception, in which slot or symbol the scheduled transmission or reception ends, the timing by reference to a slot or symbol in which the control information is received by the wireless device.

In embodiments, the network node may be configured to determine the control information indicating the timing by:
  when the wireless device is not configured with a semi-static TDD uplink-downlink allocation, determining the control information such that the scheduled at least one slot or symbol can be determined by the wireless device according to a first function of the control information,
  when the wireless device is configured with a semi-static TDD uplink-downlink allocation, determining the control information such that the scheduled at least one slot or symbol can be determined by the wireless device according to a second function of the control information different from the first function.

In other embodiments, wherein the wireless device is configured with a semi-static TDD uplink-downlink allocation, the network node may be configured to schedule the wireless device for transmission, and to determine the control information such that the wireless device determines the scheduled at least one slot or symbol only among uplink slots or symbols of the semi-static TDD uplink-downlink allocation based on the control information.

In embodiments, wherein the wireless device is configured with a semi-static TDD uplink-downlink allocation, the network node may be configured to schedule the wireless device for reception, and to determine the control information such that the wireless device determines the scheduled at least one slot or symbol only among downlink slots or symbols of the semi-static TDD uplink-downlink allocation based on the control information.

As illustrated in FIG. 7, the network node 600 may comprise at least one processing circuitry 610 and optionally also a memory 630. In embodiments, the memory 630 may be placed in some other node or unit or at least separately from the network node 600. The network node 600 may also comprise one or more input/output (I/O) units 620 configured to communicate with a wireless device or UE. The input/output (I/O) unit 620 may in embodiments comprise a transceiver connected to one or more antennas over antenna ports for wireless communication with wireless devices. The memory 630 may contain instructions executable by said at least one processing circuitry 610, whereby the network node 600 may be configured to perform any of the methods previously described herein, e.g. the ones described with reference to FIG. 6.

Figure 6:
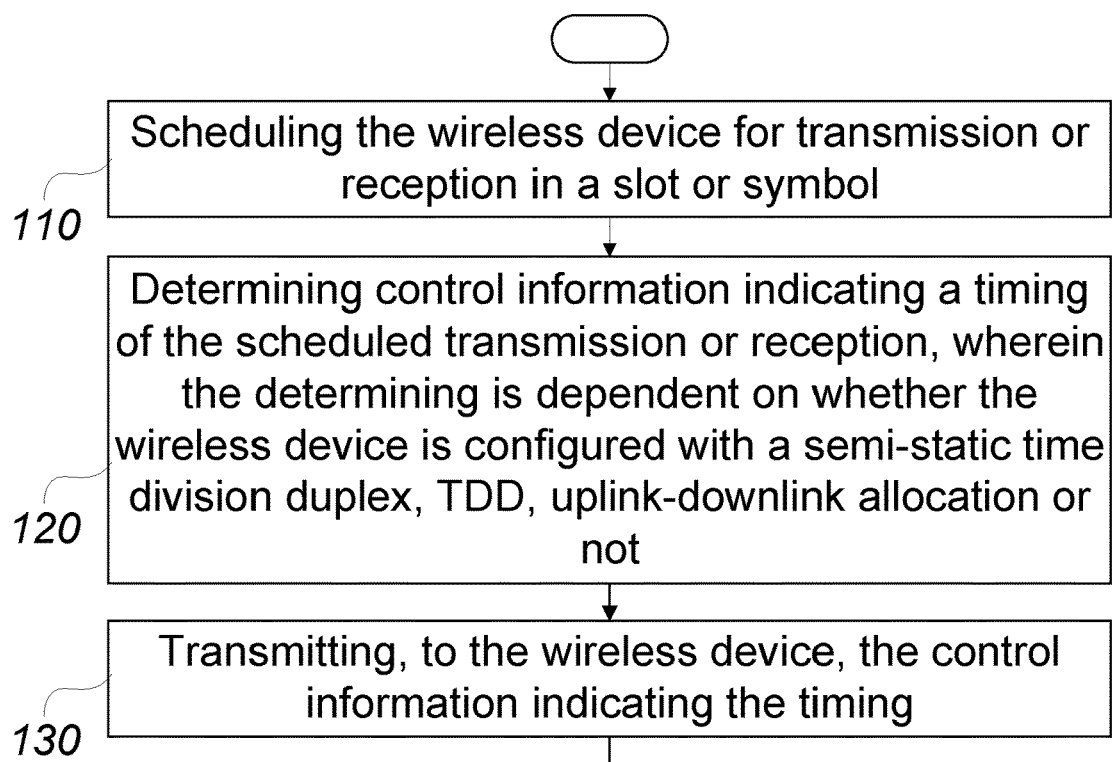
FIG. 6 is a flowchart illustrating the method in a network node according to embodiments.

In another embodiment also illustrated in FIG. 7, the network node 600 may comprise a scheduling module 611, a determining module 612, and a transmitting module 613, adapted to respectively perform the method steps of FIG. 6.

The network node 600 may contain further modules adapted to perform any of the methods previously described herein. The modules described above are functional units which may be implemented in hardware, software, firmware or any combination thereof. In one embodiment, the modules are implemented as a computer program running on the at least one processing circuitry 610.

In still another alternative way to describe the embodiment in FIG. 7, the network node 600 may comprise a Central Processing Unit (CPU) which may be a single unit or a plurality of units. Furthermore, the network node 600 may comprise at least one computer program product (CPP) with a computer readable medium 641, e.g. in the form of a non-volatile memory, e.g. an EEPROM (Electrically Erasable Programmable Read-Only Memory), a flash memory or a disk drive. The CPP may comprise a computer program 640 stored on the computer readable medium 641, which comprises code means which when run on the CPU of the network node 600 causes the network node 600 to perform the methods described earlier in conjunction with FIG. 6. In other words, when said code means are run on the CPU, they correspond to the at least one processing circuitry 610 of the network node 600 in FIG. 7.

The invention has mainly been described above with reference to a few embodiments. However, as is readily appreciated by a person skilled in the art, other embodiments than the ones disclosed above are equally possible within the scope of the invention.

List of Further Example Embodiments

E1. A method of operating a wireless device, the method comprising:
receiving (10), from a network node, control information indicating a timing of a scheduled transmission or reception, determining (20) slots or symbols for the scheduled transmission or reception based on the control information indicating the timing, wherein the determining is dependent on whether the wireless device is configured with a semi-static time division duplex, TDD, uplink-downlink allocation or not,
performing (30) the scheduled transmission or reception in the determined slots or symbols.

E2. The method according to embodiment E1, wherein the received control information indicates in which slot or symbol the scheduled transmission or reception starts.

E3. The method according to any of the preceding embodiments, wherein the received control information indicates a length of the scheduled transmission or reception.

E4. The method according to any of the preceding embodiments, wherein the received control information indicates in which slot or symbol the scheduled transmission or reception ends.

E5. The method according to any of the preceding embodiments, wherein the received control information indicates the timing by reference to a slot or symbol in which the control information is received.

E6. The method according to any of the preceding embodiments, wherein the determining (20) of slots or symbols comprises:
when the wireless device is not configured with a semi-static TDD uplink-downlink allocation, determining the set of slots or symbols according to a first function of the control information,
when the wireless device is configured with a semi-static TDD uplink-downlink allocation, determining the set of slots or symbols according to a second function of the control information different from the first function.

E7. The method according to any of the preceding embodiments, wherein the determining (20) of slots or symbols comprises:
when the wireless device is not configured with a semi-static TDD uplink-downlink allocation, determining a set of slots or symbols in accordance with the indicated timing,
when the wireless device is configured with a semi-static TDD uplink-downlink allocation, determining the set of slots or symbols in accordance with the indicated timing while taking the semi-static TDD uplink-downlink allocation into account.

E8. The method according to embodiment E7, wherein the control information indicates a timing of a scheduled transmission, and wherein determining the set of slots or symbols in accordance with the indicated timing while taking the semi-static TDD uplink-downlink allocation into account comprises determining the set of slots or symbols depending on certain properties of the semi-static TDD uplink-downlink allocation.

E9. The method according to embodiment E7, wherein the control information indicates a timing of a scheduled transmission, and wherein determining the set of slots or symbols in accordance with the indicated timing while taking the semi-static TDD uplink-downlink allocation into account comprises determining the set of slots or symbols only among uplink slots or symbols of the semi-static TDD uplink-downlink allocation.

E10. The method according to embodiment E7, wherein the control information indicates a timing of a scheduled reception, and wherein determining the set of slots or symbols in accordance with the indicated timing while taking the semi-static TDD uplink-downlink allocation into account comprises determining the set of slots or symbols only among downlink slots or symbols of the semi-static TDD uplink-downlink allocation.

E11. A method of operating a network node to schedule a wireless device for transmission or reception, the method comprising:
  scheduling (110) the wireless device for transmission or reception in a set of slots or symbols,
  determining (120) control information indicating a timing of the scheduled transmission or reception, wherein the determining is dependent on whether the wireless device is configured with a semi-static time division duplex, TDD, uplink-downlink allocation or not,
  transmitting (130), to the wireless device, the control information indicating the timing.

E12. The method according to embodiment E11, wherein the transmitted control information indicates in which slot or symbol the scheduled transmission or reception starts.

E13. The method according to any of embodiments E11-E12, wherein the transmitted control information indicates a length of the scheduled transmission or reception.

E14. The method according to any of embodiments E11-E13, wherein the transmitted control information indicates in which slot or symbol the scheduled transmission or reception ends.

E15. The method according to any of embodiments E11-E14, wherein the transmitted control information indicates the timing by reference to a slot or symbol in which the control information is transmitted.

E16. The method according to any of embodiments E11-E15, wherein the determining (120) comprises when the wireless device is configured with a semi-static TDD uplink-downlink allocation:
  determining the control information taking the semi-static TDD uplink-downlink allocation into account, such that the control information indicates a timing that corresponds to the scheduled set of slots or symbols.

E17. A wireless device (500) configured to:
  receive, from a network node, control information indicating a timing of a scheduled transmission or reception,
  determine slots or symbols for the scheduled transmission or reception based on the control information indicating the timing, wherein the determining is dependent on whether the wireless device is configured with a semi-static time division duplex, TDD, uplink-downlink allocation or not,
  perform the scheduled transmission or reception in the determined slots or symbols.

E18. The wireless device of embodiment E17, further configured to perform the method of any of embodiments E2-E10.

E19. A wireless device (500) comprising a processing circuitry (610) and a memory (630), the memory containing instructions executable by the processing circuitry whereby the wireless device is configured to:
  receive, from a network node, control information indicating a timing of a scheduled transmission or reception,
  determine slots or symbols for the scheduled transmission or reception based on the control information indicating the timing, wherein the determining is dependent on whether the wireless device is configured with a semi-static time division duplex, TDD, uplink-downlink allocation or not,
  perform the scheduled transmission or reception in the determined slots or symbols.

E20. The wireless device of embodiment E19, wherein the memory contains instructions executable by the processing circuitry, whereby the wireless device is configured to perform the method of any of embodiments E2-E10.

E21. A wireless device (500) comprising:
  a receiving module (511) adapted to receive, from a network node, control information indicating a timing of a scheduled transmission or reception,
  a determining module (512) adapted to determine slots or symbols for the scheduled transmission or reception based on the control information indicating the timing, wherein the determining is dependent on whether the wireless device is configured with a semi-static time division duplex, TDD, uplink-downlink allocation or not,
  a performing module (513) adapted to perform the scheduled transmission or reception in the determined slots or symbols.

E22. The wireless device of embodiment E21, comprising further modules adapted to perform the method of any of embodiments E2-E10.

E23. A computer program comprising instructions which, when executed by at least one processor of a wireless device, causes the wireless device to carry out the method of any of embodiments E1-E10.

E24. A carrier containing the computer program of embodiment E23, wherein the carrier is one of an electronic signal, optical signal, radio signal, or computer readable storage medium.

E25. A network node (600) configured to schedule a wireless device for transmission or reception, the network node being further configured to:
  schedule the wireless device for transmission or reception in a set of slots or symbols,
  determine control information indicating a timing of the scheduled transmission or reception, wherein the determining is dependent on whether the wireless device is configured with a semi-static time division duplex, TDD, uplink-downlink allocation or not,
  transmit, to the wireless device, the control information indicating the timing.

E26. The network node of embodiment E25, further configured to perform the method of any of embodiments E12-E16.

E27. A network node (600) configured to schedule a wireless device for transmission or reception, comprising a processing circuitry (610) and a memory (630), the memory containing instructions executable by the processing circuitry whereby the network node is configured to:
  schedule the wireless device for transmission or reception in a set of slots or symbols,
  determine control information indicating a timing of the scheduled transmission or reception, wherein the determining is dependent on whether the wireless device is configured with a semi-static time division duplex, TDD, uplink-downlink allocation or not,
  transmit, to the wireless device, the control information indicating the timing.

E28. The network node of embodiment E27, wherein the memory contains instructions executable by the processing circuitry, whereby the network node is configured to perform the method of any of embodiments E12-E16.

E29. A network node (600) comprising:
  a scheduling module (611) adapted to schedule the wireless device for transmission or reception in a set of slots or symbols, a determining module (612) adapted to determine control information indicating a timing of the scheduled transmission or reception, wherein the determining is dependent on whether the wireless device is configured with a semi-static time division duplex, TDD, uplink-downlink allocation or not, a transmitting module (613) adapted to transmit, to the wireless device, the control information indicating the timing.

E30. The network node of embodiment E29, comprising further modules adapted to perform the method of any of embodiments E12-E16.

E31. A computer program comprising instructions which, when executed by at least one processor of a network node, causes the network node to carry out the method of any of embodiments E11-E16.

E32. A carrier containing the computer program of embodiment 31, wherein the carrier is one of an electronic signal, optical signal, radio signal, or computer readable storage medium.

The invention claimed is:

1. A method of operating a wireless device, the method comprising:

receiving, from a network node, control information indicating a timing of a scheduled transmission or reception;

determining the timing of the scheduled transmission or reception according to a first interpretation or a second interpretation of the control information, wherein the wireless device uses the first interpretation or the second interpretation in dependence on whether the wireless device is operating with a dynamic Time Division Duplex (TDD) allocation or a semi-static TDD allocation; and performing the scheduled transmission or reception, according to the determined timing; and wherein the received control information indicates a count value for determining a starting slot or symbol of the scheduled transmission or reception subsequent to a reception slot or symbol in which the control information is received, and, when determining the starting slot or symbol using the first interpretation, the wireless device counts slots or symbols subsequent to the starting slot or symbol without regard to any directional sense of the subsequent slots or symbols, and, when determining the starting slot or symbol using the second interpretation, the wireless device counts only slots or symbols subsequent to the starting slot or symbol that, according to the semi-static TDD allocation, have a same directional sense as the scheduled transmission or reception.

2. The method according to claim 1, wherein the scheduled transmission or reception is a scheduled downlink reception and wherein said determining of the timing of the scheduled transmission or reception according to the first interpretation comprises the wireless device determining a starting slot or symbol of the scheduled downlink reception by considering, according to a count value or index received in the control information, each slot or symbol after a reception slot or symbol in which the wireless device received the control information, and wherein said determining of the timing of the scheduled transmission or reception according to the second interpretation comprises the wireless device determining the starting slot or symbol of the scheduled downlink reception by considering, according to the count value or index, only slots or symbols after the reception slot or symbol that, according to the semi-static TDD configuration, are designated as downlink slots or symbols.

3. The method according to claim 1, wherein the scheduled transmission or reception is a scheduled uplink transmission and wherein said determining of the timing of the scheduled transmission or reception according to the first interpretation comprises the wireless device determining a starting slot or symbol of the scheduled uplink transmission by considering, according to a count value or index received in the control information, each slot or symbol after a reception slot or symbol in which the wireless device received the control information, and wherein said determining of the timing of the scheduled transmission or reception according to the second interpretation comprises the wireless device determining the starting slot or symbol of the scheduled uplink transmission by counting only slots or symbols after the reception slot or symbol that are, according to the semi-static TDD configuration, designated as uplink slots or symbols.

4. The method according to claim 1, wherein the control information indicates a length of the scheduled transmission or reception, and wherein said determining of the timing of the scheduled transmission or reception according to the first interpretation comprises the wireless device interpreting the length as referring to contiguous slots or symbols, and wherein said determining of the timing of the scheduled transmission or reception according to the second interpretation comprises the wireless device interpreting the length as referring to slots or symbols having a same directional sense as the scheduled transmission or reception, where such slots or symbols may not be contiguous.

5. A wireless device comprising a processing circuitry and a memory, the memory containing instructions executable by the processing circuitry whereby the wireless device is configured to:

receive, from a network node, control information indicating a timing of a scheduled transmission or reception;

determine the timing of the scheduled transmission or reception according to a first interpretation or a second interpretation of the control information, wherein the wireless device uses the first interpretation or the second interpretation in dependence on whether the wireless device is operating with a dynamic Time Division Duplex (TDD) allocation or a semi-static TDD allocation; and perform the scheduled transmission or reception, according to the determined timing; and wherein the received control information indicates a count value for determining a starting slot or symbol of the scheduled transmission or reception subsequent to a reception slot or symbol in which the control information is received, and, when determining the starting slot or symbol using the first interpretation, the wireless device counts slots or symbols subsequent to the starting slot or symbol without regard to any directional sense of the subsequent slots or symbols, and, when determining the starting slot or symbol using the second interpretation, the wireless device counts only slots or symbols subsequent to the starting slot or symbol that, according to the semi-static TDD allocation, have a same directional sense as the scheduled transmission or reception.

* * * * *